(12) United States Patent
Sakai et al.

(10) Patent No.: US 11,329,819 B2
(45) Date of Patent: May 10, 2022

(54) INFORMATION PROCESSING SYSTEM, METHOD FOR CHANGING PUBLIC KEY, PROGRAM, AND METHOD FOR BUILDING INFORMATION PROCESSING SYSTEM

(71) Applicant: TOHOKU UNIVERSITY, Sendai (JP)

(72) Inventors: Masao Sakai, Sendai (JP); Junya Iwazaki, Sendai (JP); Eisuke Koizumi, Sendai (JP); Shingo Hasegawa, Sendai (JP); Shuji Isobe, Sendai (JP); Masayuki Fukumitsu, Ebetsu (JP)

(73) Assignee: TOHOKU UNIVERSITY, Sendai (JP)

( * ) Notice: Subject to any disclaimer, the term of this patent is extended or adjusted under 35 U.S.C. 154(b) by 295 days.

(21) Appl. No.: 16/674,353

(22) Filed: Nov. 5, 2019

(65) Prior Publication Data
US 2020/0153628 A1  May 14, 2020

(30) Foreign Application Priority Data

Nov. 9, 2018 (JP) .............................. JP2018-211811

(51) Int. Cl.
*H04L 9/30* (2006.01)
(52) U.S. Cl.
CPC ............ *H04L 9/30* (2013.01); *H04L 2209/24* (2013.01); *H04L 2209/38* (2013.01)
(58) Field of Classification Search
CPC ........................................................ H04L 9/30
See application file for complete search history.

(56) References Cited

U.S. PATENT DOCUMENTS 10,385,389 B2 * 8/2019 Heron ............ C12Y 605/01001
11,080,336 B2 * 8/2021 Van Dusen ............ G06Q 50/01

OTHER PUBLICATIONS

Duffield et al., "Dash: A Payments-Focused Cryptocurrency", Whitepaper, [online], Internet <URL:https://github.com/dashpay/dash/wiki/Whitepaper>, printed on Oct. 31, 2019, 11 pages.
Noether et al., "Ring Confidential Transactions", Ledger, 2016, vol. 1, pp. 1-18.

* cited by examiner

*Primary Examiner* — Simon P Kanaan
(74) *Attorney, Agent, or Firm* — MH2 Technology Law Group, LLP (57) ABSTRACT

An information processing system 100 comprising at least one first node 1, second nodes 2 for providing a public key change assistance service, and a blockchain 3, wherein the first node 1 comprises a new public key creation unit 151, a second node group selection unit 152, an old and new key information request unit 153, a draft contract preparation unit 154, a signature request unit 155, a first signature execution unit 156, and a registration unit 157; each second node 2 comprises an old and new key information transmission unit 251, a second signature execution unit 252, and a draft contract return unit 253; the draft contract preparation unit 154 randomly determines the order of new public keys as transmission destinations; and the signature request unit 155 and the first signature execution unit 156 perform signature request and execution, respectively, so that the order of the nodes that sign a draft transaction contract is random.

8 Claims, 6 Drawing Sheets

| Draft transaction contract | | | Expiration date YY:MM:DD hh:mm:ss | |
|---|---|---|---|---|
| Sign | IN | | OUT | |
| ○ | PKo[B] | 1.0[BTC] | PKn[B] | 1.1[BTC] |
| ○ | PKo[U] | 1.5[BTC] | PKn[A] | 1.1[BTC] |
| ○ | PKo[A] | 1.0[BTC] | PKn[U] | 1.1[BTC] |
| | | | Registration fee | 0.2[BTC] |

FIG. 6A

Draft transaction contract — Expiration date YY:MM:DD hh:mm:ss

| Sign | IN | | OUT | |
|---|---|---|---|---|
| ○ | PKo[B] | 1.0[BTC] | PKn[B] | 1.1[BTC] |
| ○ | PKo[U] | 1.5[BTC] | PKn[A] | 1.1[BTC] |
| ● | PKo[A] | 1.0[BTC] | PKn[U] | 1.1[BTC] |
| | | | Registration fee | 0.2[BTC] |

FIG. 6B

Draft transaction contract — Expiration date YY:MM:DD hh:mm:ss

| Sign | IN | | OUT | |
|---|---|---|---|---|
| ○ | PKo[B] | 1.0[BTC] | PKn[B] | 1.1[BTC] |
| ● | PKo[U] | 1.5[BTC] | PKn[A] | 1.1[BTC] |
| ● | PKo[A] | 1.0[BTC] | PKn[U] | 1.1[BTC] |
| | | | Registration fee | 0.2[BTC] |

FIG. 6C

Draft transaction contract — Expiration date YY:MM:DD hh:mm:ss

| Sign | IN | | OUT | |
|---|---|---|---|---|
| ● | PKo[B] | 1.0[BTC] | PKn[B] | 1.1[BTC] |
| ● | PKo[U] | 1.5[BTC] | PKn[A] | 1.1[BTC] |
| ● | PKo[A] | 1.0[BTC] | PKn[U] | 1.1[BTC] |
| | | | Registration fee | 0.2[BTC] |

INFORMATION PROCESSING SYSTEM, METHOD FOR CHANGING PUBLIC KEY, PROGRAM, AND METHOD FOR BUILDING INFORMATION PROCESSING SYSTEM

TECHNICAL FIELD

The present invention relates to an information processing system for changing a public key for use in transactions of crypto currencies and the like; a method for changing a public key; a program; and a method for building an information processing system.

BACKGROUND ART

In crypto currencies etc., all transaction contracts (transactions) are described in a blockchain, and are opened to users of all nodes constituting the blockchain. Thus, as a general rule, it is quite obvious which user (public key) has conducted what kind of transaction.

On a blockchain, a user is represented only as a public key (bit-string identifier); however, there is a possibility that the public key may be associated with the actual user information (name, location, etc.) in the course of repeated transactions. In this case, the public key in use must be changed to another new public key anonymously in order to maintain the anonymity of the user.

DASH (former name: Darkcoin) is known as such a crypto currency that allows public keys to be changed anonymously (for example, Non-Patent Literature 1). In DASH, users with a balance higher than a certain level (masternodes) complexly synthesize transaction registration (public key change) requests from an unspecified number of users to the blockchain, to thereby achieve anonymous transaction registration (public key change) on the blockchain.

However, even DASH's public key change technique has a problem in that the correspondence between the public key of a remittance source (public key of a requesting user before change), i.e., the old public key, and the public key of a remittance destination (public key after change), i.e., the new public key, is known only to the masternodes.

In contrast, Monero is known as a crypto currency that allows a public key to be changed without anyone other than the person who changes the public key knowing the correspondence between the old and new public keys (for example, Non-Patent Literature 2).

Monero's public key change technique uses the following four elemental techniques.
(1) A ring signature technique for creating a joint electronic signature from multiple public keys
(2) A technique for concealing the balance of each account (public key) on the blockchain from anyone other than the account holder, by encrypting the remittance amount described in a transaction contract using the homomorphic encryption technique.
(3) A technique that allows a third party to verify that the encrypted total cumulative deposit amount of the true transmission source account in a transaction contract (transaction) matches the encrypted total remittance amount, without decryption.
(4) A technique for preventing a transaction contract for a second remittance from the same account from being registered in the blockchain.

Specifically, a user who wants to exchange their public key anonymously (hereinafter referred to as an "exchanger") browses transaction contracts registered in the blockchain, and obtains third-party public key information (hereinafter, third-party public key A, B, . . . , Z) used as a dummy and the encrypted total deposit amount of each account. Although information regarding such an encrypted total deposit amount can be easily obtained by anyone from the blockchain information due to the characteristics of the homomorphic encryption technique, this information is difficult to decrypt. Next, the exchanger prepares a transaction contract for exchanging the public key as follows.

In the remittance source account information of the transaction contract, the following are described.
    The Exchanger's old public key and encrypted total deposit amount
    Third-party public key A and encrypted total deposit amount
    Third-party public key B and encrypted total deposit amount . . . .
    Third-party public key Z and encrypted total deposit amount In the remittance destination account information of the transaction contract, the following are described.
    The fee
    The new public key of the exchanger as the remittance destination, and the encrypted remittance amount (amount remaining after subtracting the fee from the total deposit amount of the old public key)

Furthermore, the identification information of the private key associated with the old public key of the remittance source is described in the transaction contract. Registration of this transaction is rejected if a transaction contract including the same identification information has already been registered in the blockchain. This prevents a second withdrawal (double-spending) from the same account (public key).

Finally, the transaction contract is completed by an electronic signature that proves to third parties, by using the ring signature technique, that the contents described in the transaction contract are correct; and the transaction contract is registered in the blockchain. The public key is thereby exchanged.

As described above, in Monero, technique (1) makes it possible to include multiple dummy accounts as remittance source accounts (public keys), so that the true remittance source can be hidden from third parties. Furthermore, as in technique (2), the remittance amount is encrypted to prevent a person from being aware of a change in the account balance of another person from the blockchain information. This avoids the problem such that a third party can infer the true remittance source account in the transaction contract from a change in the balance of each remittance source account.

On the other hand, due to the side effects of techniques (1) and (2), miners who play the role of registering new transaction contracts in the blockchain cannot know the total cumulative deposit amount of each account. As a result, miners cannot verify whether the input and output amounts described in a transaction contract are balanced, and cannot determine whether the transaction contract can be registered in the blockchain.

Thus, in Monero, technique (3) enables miners to determine whether a transaction contract can be registered in the blockchain. However, if remittance processing has been performed in the true remittance source account in the transaction contract in the past, miners cannot accurately know the remittance amount (because it is encrypted). With technique (3) alone, whether the transaction contract can be registered in the blockchain cannot be determined. This is because with technique (3), although it is possible to determine whether the "encrypted cumulative deposit amount" and the "encrypted transaction amount" match, it is not possible to determine whether the "encrypted cumulative deposit amount, minus the cumulative withdrawal amount" matches the "encrypted transaction amount."

Therefore, in Monero, the number of withdrawals from the same account is limited to one by using technique (4). Consequently, the cumulative withdrawal amount is always 0 in transaction contracts registered in the blockchain. This avoids the above-mentioned problem, and allows for the effective use of technique (3).

CITATION LIST

Non-Patent Literature

NPL 1: "Whitepaper," (online), Internet (URL: https://github.com/dashpay/dash/wiki/Whitepaper)
NPL 2: Shen Noether and two others, "Ring Confidential Transactions," (online), Internet (URL: https://ledgerjournal.org/ojs/index.php/ledger/article/viewFile/34/61)

SUMMARY OF INVENTION

Technical Problem

However, in Monero, since the remittance amount is encrypted in a transaction contract, a third party cannot know the balance of the account owned by another person in real time. Monero thus cannot be used for an application service in which a service provider must know account balance information for each user. That is, Monero has a problem concerning poor expandability and developability.

The present invention has been accomplished to solve the above problem. An object of the present invention is to provide an information processing system that allows a public key change with higher anonymity, while having a function by which a third party can make balance inquiries in real time.

Solution to Problem

The information processing system according to the present invention is an information processing system comprising at least one first node, second nodes for providing a public key change assistance service, and a database, wherein
the first node comprises
a new public key creation unit that creates a new public key of the first node,
a second node group selection unit that selects at least two different second nodes from among the second nodes,
an old and new key information request unit that requests, from each selected second node, information regarding an old public key and a new public key of the second node,
a draft contract preparation unit that prepares a draft transaction contract in which an old public key of the first node and the old public key obtained from each second node are described as transmission sources, and the new public key of the first node and the new public key obtained from each second node are described as transmission destinations,
a signature request unit that requests each selected second node to sign in a place corresponding to the second node of the draft transaction contract,
a first signature execution unit that executes a signature in a place corresponding to the first node of the draft transaction contract, and
a registration unit that registers the draft transaction contract in which all signatures are completed as a transaction contract in the database;
each second node comprises
an old and new key information transmission unit that transmits information regarding the old public key and the new public key of the second node to the first node in response to the request from the old and new key information request unit,
a second signature execution unit that confirms whether a correspondence between the transmission source and the transmission destination of the second node in the draft transaction contract is valid in response to the request from the signature request unit, and executes a signature in a place corresponding to the second node of the draft transaction contract when the correspondence is valid, and
a draft contract return unit that returns the draft transaction contract signed by the second signature execution unit to the first node;
the draft contract preparation unit randomly determines the order of the new public keys as the transmission destinations; and
the signature request unit and the first signature execution unit perform the signature request and execution, respectively, so that the order of the nodes that sign the draft transaction contract is random.

The method for changing a public key according to the present invention is a method for changing a public key in an information processing system comprising at least one first node, second nodes for providing a public key change assistance service, and a database, the method comprising:
a new public key creation step of creating a new public key, in the first node;
a second node group selection step of selecting at least two different second nodes from among the second nodes, in the first node;
an old and new key information request step of requesting, from each selected second node, information regarding an old public key and a new public key of the second node, in the first node;
an old and new key information transmission step of transmitting information regarding the old public key and the new public key of each second node to the first node in response to the request in the old and new key information request step, in the second node;
a draft contract preparation step of preparing a draft transaction contract in which an old public key of the first node and the old public key obtained from each second node are described as transmission sources, and the new public key of the first node and the new public key obtained from each second node are described as transmission destinations, in the first node;
a signature request step of requesting each selected second node to sign in a place corresponding to the second node of the draft transaction contract, in the first node;
a second signature execution step of confirming whether a correspondence between the transmission source and the transmission destination of each second node in the draft transaction contract is valid in response to the request in the signature request step, and executing a signature in a place corresponding to the second node of the draft transaction contract when the correspondence is valid, in the second node;

a draft contract return step of returning the draft transaction contract signed in the second signature execution step to the first node, in the second node;

a first signature execution step of executing a signature in a place corresponding to the first node of the draft transaction contract, in the first node; and a registration step of registering the draft transaction contract in which all signatures are completed as a transaction contract in the database, in the first node;

wherein in the draft contract preparation step, the order of the new public keys as the transmission destinations is randomly determined; and in the signature request step and the first signature execution step, the signature request and execution are performed, respectively, so that the order of the nodes that sign the draft transaction contract is random.

The program according to the present invention is a program for assisting in changing a public key of a first node communicatively connected to second nodes for providing a public key change assistance service and a database, the program causing a computer to operate as a new public key creation unit that creates a new public key of the first node, a second node group selection unit that selects at least two different second nodes from among the second nodes, an old and new key information request unit that requests, from each selected second node, information regarding an old public key and a new public key of the second node, a draft contract preparation unit that prepares a draft transaction contract in which an old public key of the first node and the old public key obtained from each second node are described as transmission sources, and the new public key of the first node and the new public key obtained from each second node are described as transmission destinations, a signature request unit that requests each selected second node to sign in a place corresponding to the second node of the draft transaction contract, a first signature execution unit that executes a signature in a place corresponding to the first node of the draft transaction contract, and a registration unit that registers the draft transaction contract in which all signatures are completed as a transaction contract in the database, wherein the draft contract preparation unit randomly determines the order of the new public keys as the transmission destinations; and the signature request unit and the first signature execution unit perform the signature request and execution, respectively, so that the order of the nodes that sign the draft transaction contract is random.

The method for building an information processing system according to the present invention is a method for building an information processing system that comprises at least one first node, second nodes for providing a public key change assistance service, and a database, the method comprising:

a step of delivering to the first node a program for causing a computer to operate as a new public key creation unit that creates a new public key of the first node, a second node group selection unit that selects at least two different second nodes from among the second nodes, an old and new key information request unit that requests, from each selected second node, information regarding an old public key and a new public key of the second node, a draft contract preparation unit that prepares a draft transaction contract in which an old public key of the first node and the old public key obtained from each second node are described as transmission sources, and the new public key of the first node and the new public key obtained from each second node are described as transmission destinations, a signature request unit that requests each selected second node to sign in a place corresponding to the second node of the draft transaction contract, a first signature execution unit that executes a signature in a place corresponding to the first node of the draft transaction contract, and a registration unit that registers the draft transaction contract in which all signatures are completed as a transaction contract in the database; and a step of delivering to each second node a program for causing a computer to operate as an old and new key information transmission unit that transmits information regarding the old public key and the new public key of the second node to the first node in response to the request from the old and new key information request unit, a second signature execution unit that confirms whether a correspondence between the transmission source and the transmission destination of the second node in the draft transaction contract is valid in response to the request from the signature request unit, and executes a signature in a place corresponding to the second node of the draft transaction contract when the correspondence is valid, and a draft contract return unit that returns the draft transaction contract signed by the second signature execution unit to the first node;

wherein the draft contract preparation unit randomly determines the order of the new public keys as the transmission destinations; and the signature request unit and the first signature execution unit perform the signature request and execution, respectively, so that the order of the nodes that sign the draft transaction contract is random.

The database is preferably a blockchain.

Advantageous Effects of Invention

According to the present invention, the signature request unit and the first signature execution unit are set to perform signature request and execution, respectively, so that the order of the nodes that sign a draft transaction contract is random. This makes it difficult for third parties other than the user of a first node to guess the correspondence between the old and new public keys of the first node. Additionally, unlike Monero, the remittance amount is not encrypted in a transaction contract; therefore, a third party can know the balance of an account owned by another person in real time. A public key can thus be changed with higher anonymity, while having a function by which a third party can make balance inquiries in real time.

BRIEF DESCRIPTION OF DRAWINGS

FIG. 6(*a*) illustrates a draft transaction contract signed by one second node. FIG. 6(*b*) illustrates the draft transaction contract further signed by a first node. FIG. 6(*c*) illustrates the draft transaction contract that is further signed by the other second node, and in which signatures are completed.

DESCRIPTION OF EMBODIMENTS

Hereinafter, an embodiment according to the present invention is described with reference to the drawings. However, the present invention is not limited to the embodiment described below.

System Configuration

Figure 1:
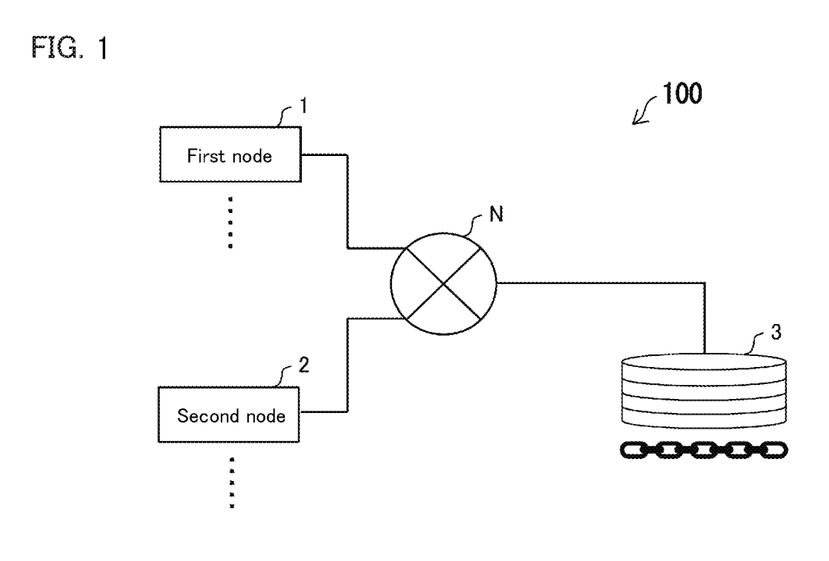
FIG. 1 schematically illustrates an information processing system according to one embodiment of the present invention.

FIG. 1 schematically illustrates an information processing system 100 according to one embodiment of the present invention. The information processing system 100 is a platform using the blockchain technique. The information processing system 100 includes at least one first node 1, second nodes 2, and a blockchain 3. The first node 1, the second nodes 2, and the blockchain 3 are communicatively connected to each other by wire or wirelessly via a communication network N, such as the internet.

The first node 1 is an information processing device in which a first program for achieving exchange of public keys while maintaining high anonymity is installed. The first node 1 may be composed of a general-purpose computer, such as a desktop PC, a laptop PC, a smartphone, a tablet terminal, or a PDA.

Each second node 2 is an information processing device that provides a public key change assistance service (hereinafter referred to as a "key change assistance service"). In the second node 2, a second program for achieving a key change assistance service is installed. A node that provides a key change assistance service is also referred to as a relay node.

Due to the nature of the present invention, the information processing system 100 should include at least two second nodes 2, preferably three or more second nodes 2. In actuality, since such a second node 2 is often managed by a vendor that provides a key change assistance service for fee income, many second nodes 2 are present in the information processing system 100.

The blockchain 3 is formed as follows: information regarding transaction contracts (transactions) executed between all nodes existing in the information processing system 100 is consolidated at regular intervals, and blocked; and evidence information indicating that each block satisfies conditions for consolidation with the previous block is recorded in each block, and then blocks are connected in a chain shape. The blockchain 3 contains the records of all previous transactions, and is managed by a group of nodes existing in the information processing system 100 in a decentralized manner. The information processing system 100 can make a transaction via its own crypto currency. Examples of such a crypto currency include Bitcoin and Ethereum. In this embodiment, the crypto currency is assumed to be Bitcoin.

Additionally, the information processing system 100 may include a node other than the first node 1 and the second nodes 2; i.e., a node in which neither the first program nor the second program is installed.

Configuration of Each Node

Figure 2:
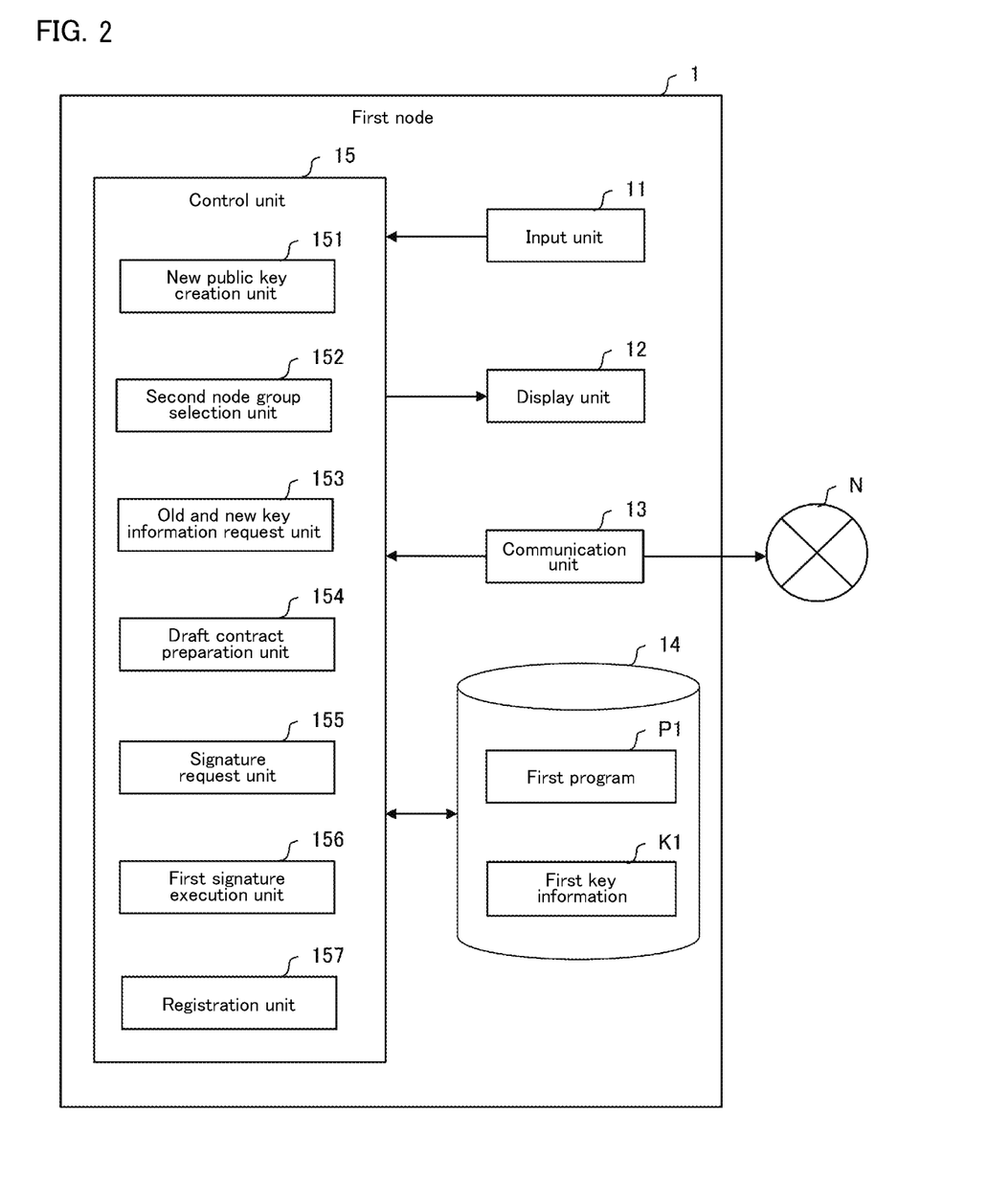
FIG. 2 is a functional block diagram illustrating the configuration of a first node.
Figure 3:
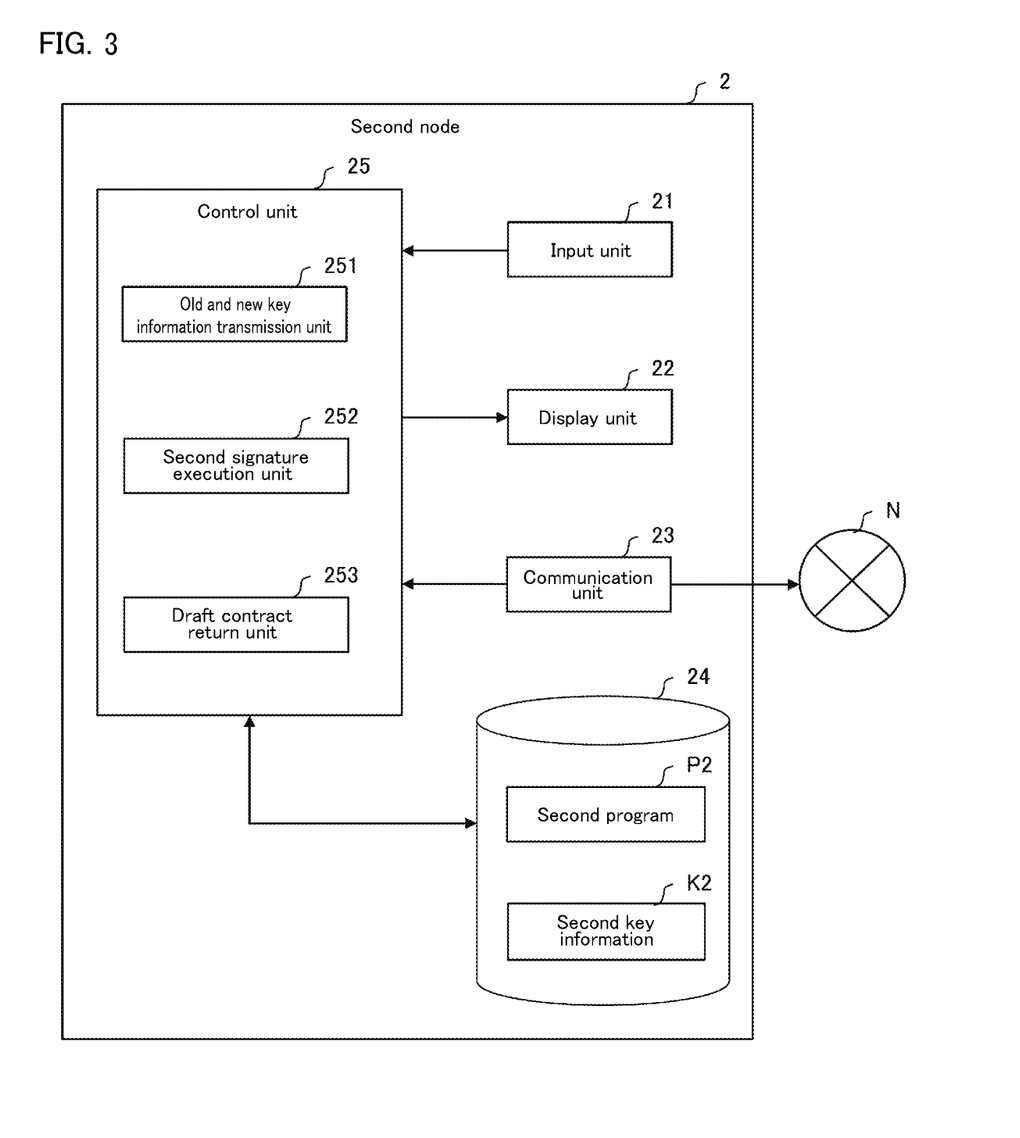
FIG. 3 is a functional block diagram illustrating the configuration of a second node.

FIG. 2 is a functional block diagram illustrating the configuration of the first node 1. FIG. 3 is a functional block diagram illustrating the configuration of each second node 2.

As shown in FIG. 2, the first node 1 includes an input unit 11, a display unit 12, a communication unit 13, a storage unit 14, and a control unit 15.

The input unit 11 may be composed of, for example, a keyboard, a mouse, or a touchscreen. The display unit 12 may be composed of, for example, a liquid crystal display or an organic EL display. The communication unit 13 is an interface that allows the first node 1 to communicate with, for example, other nodes via the communication network N.

The storage unit 14 is a nonvolatile auxiliary storage device for storing various types of programs and data used by the first node 1. The storage unit 14 may be composed of, for example, a hard disk drive (HDD) or a solid-state drive (SSD).

The storage unit 14 stores a first program P1 and first key information K1 according to this embodiment. The first program P1 is a program for causing the first node 1 to execute a part of the processing steps of a key change assistance service provided in the information processing system 100. The method for delivering the first program P1 to the first node 1 can be any method. The first program P1 may be downloaded to the first node 1 via the communication network N; or the first program P1 may be stored in a non-transitory computer-readable recording medium, and then installed in the first node 1 via the recording medium. For example, if a smartphone is used as the first node 1, the first program P1 can be delivered to the first node 1 via the App Store (registered trademark) of Apple Inc., or Google Play (registered trademark) of Google LLC.

The first key information K1 is information regarding public keys that are used by the first node 1 in transactions in the information processing system 100. Specifically, the first key information K1 includes pairs of a public key currently used in the first node 1 and a private key associated therewith. The private keys may be stored in a device other than the first node 1.

The control unit 15 is a functional block that is put into practice when an arithmetic processing unit, such as a CPU or an MPU, provided in the first node 1 retrieves the first program P1 stored in the storage unit 14 into a main storage device, such as a RAM, and executes the first program P1. The control unit 15 includes a new public key creation unit 151, a second node group selection unit 152, an old and new key information request unit 153, a draft contract preparation unit 154, a signature request unit 155, a first signature execution unit 156, and a registration unit 157. The functions of these units are described later.

As shown in FIG. 3, each second node 2 includes an input unit 21, a display unit 22, a communication unit 23, a storage unit 24, and a control unit 25. The input unit 21, the display unit 22, the communication unit 23, and the storage unit 24 may be respectively configured in the same manner as the input unit 11, the display unit 12, the communication unit 13, and the storage unit 14 in the first node 1.

The storage unit 24 stores a second program P2 and second key information K2 according to this embodiment. The second program P2 is a program for causing the second node 2 to execute a part of the processing steps of a key change assistance service provided in the information processing system 100. The method for delivering the second program P2 to the second node 2 can be any method. The second program P2 may be downloaded to the second node 2 via the communication network N; or the second program P2 may be stored in a non-transitory computer-readable recording medium, and then installed in the second node 2 via the recording medium.

The second key information K2 is information regarding public keys that are used by the second node 2 in transactions in the information processing system 100. Specifically, the second key information K2 includes pairs of a public key currently used in the second node 2 and a private key associated therewith. The private keys may be stored in a device other than the second node 2.

The control unit 25 is a functional block that is put into practice when an arithmetic processing unit, such as a CPU or an MPU, provided in the second node 2 retrieves the second program P2 stored in the storage unit 24 into a main storage device, such as a RAM, and executes the second program P2. The control unit 25 includes an old and new key information transmission unit 251, a second signature execution unit 252, and a draft contract return unit 253. The functions of these units are described later.

Processing Procedure

Figure 4:
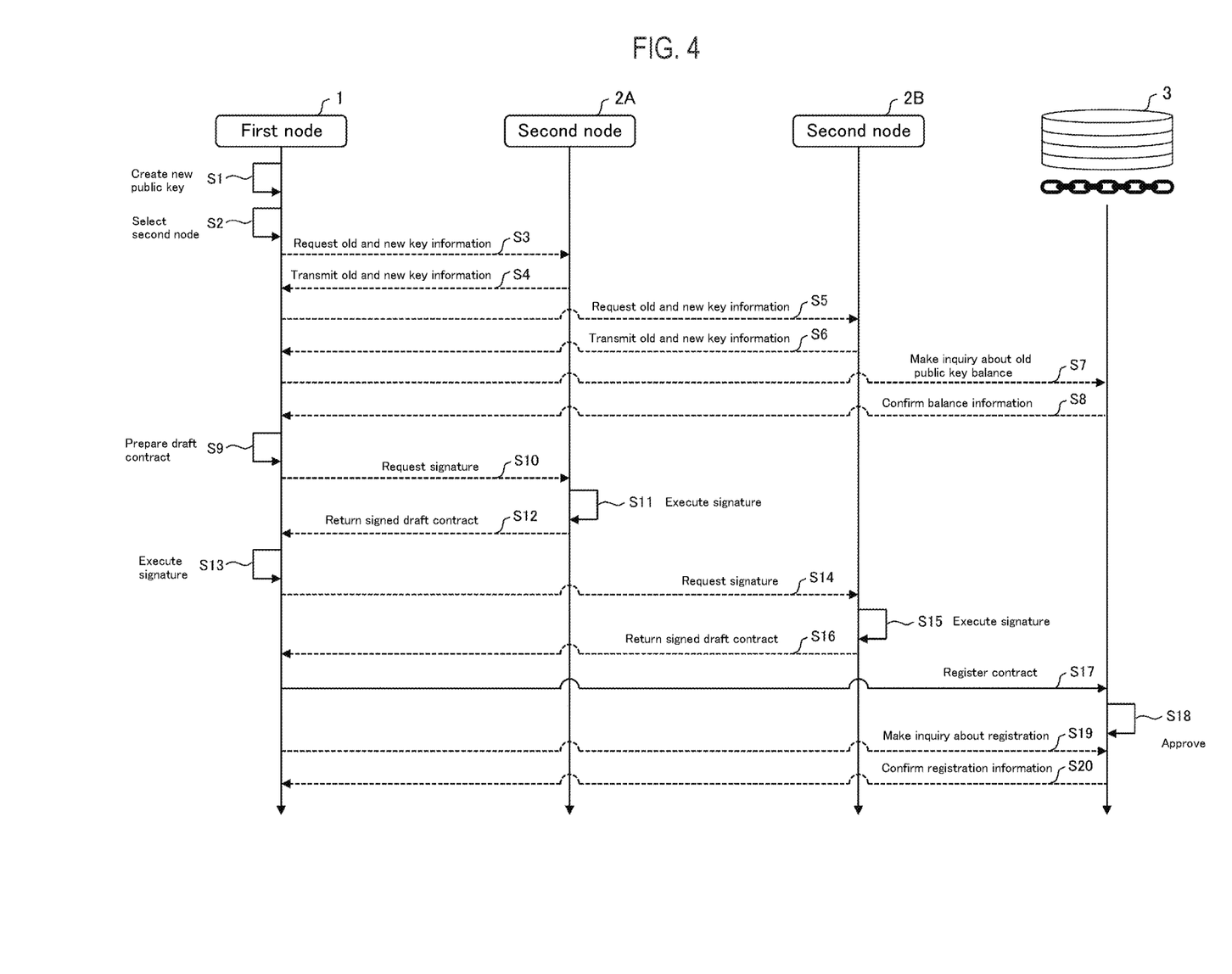
FIG. 4 is a sequence chart illustrating processing for changing a public key of a first node in the information processing system.

FIG. 4 is a sequence chart illustrating the steps of processing for changing a public key of the first node 1 in the information processing system 100. Regarding the arrows indicating the communication between nodes in FIG. 4, the solid-line arrows indicate broadcasting, and the dashed-line arrows indicate an anonymous encryption communication whose sender is anonymized and whose communication channel is encrypted. The form of communication in each processing step is not limited to those described above.

In this embodiment, the main processing steps in FIG. 4 are executed by the control unit 15 of the first node 1 shown in FIG. 2 and the control unit 25 of the second node 2 shown in FIG. 3. Additionally, a user may manually execute a part of the processing steps in FIG. 4 via the input unit 11 of the first node 1 or the input unit 21 of the second node.

First, in the first node 1, the new public key creation unit 151 creates a new public key corresponding to an old public key of the first node 1 (step S1; new public key creation step). The old public key means a public key that is possessed by the first node 1 at the start of use of a key change assistance service, and that the user desires to change. The new public key is a new public key that replaces the old public key.

Commonly, in public key change processing, a plurality of old public keys is often changed to a plurality of new public keys. However, for convenience of explanation, in this embodiment, an example in which one old public key is changed to one new public key is described. It is assumed that the old public key is PKo[U], and that the new public key is PKn[U]. It is also assumed that the currency amount corresponding to the old public key (the balance of the old public key) is 1.5 BTC. When a new public key is created, information regarding the new public key is stored in the storage unit 14, and the first key information K1 is updated.

Subsequently, the second node group selection unit 152 of the first node 1 selects at least two different second nodes 2 from many second nodes 2 provided in the information processing system 100 (step S2; second node group selection step). The criteria for selection of the second nodes 2 is not particularly limited; and the second node group selection unit 152 collects and obtains the latest information regarding the information processing system 100, and selects second nodes 2 that provide, for example, a highly reliable key change assistance service.

In this embodiment, the second node group selection unit 152 selects two second nodes 2. In FIG. 4, one of the selected second nodes 2 is referred to as a "second node 2A," and the other is referred to as a "second node 2B."

The order of step S1 and step S2 may be reversed.

Subsequently, the old and new key information request unit 153 of the first node 1 requests, from each of the selected second nodes 2A and 2B, information regarding an old public key of each second node and a new public key corresponding to the old public key for key change assistance (steps S3 and S5; old and new key information request step). Specifically, the old and new key information request unit 153 requests information regarding an old public key of the second node 2A and a new public key corresponding to the old public key from the second node 2A (step S3), and requests information regarding an old public key of the second node 2B and a new public key corresponding to the old public key from the second node 2B (step S5). The number of pairs of an old public key and a new public key that the old and new key information request unit 153 requests from one second node 2 is not particularly limited. In this embodiment, the old and new key information request unit 153 requests information regarding one pair of an old public key and a new public key from each of the second nodes 2A and 2B.

The old and new key information transmission unit 251 of each second node 2 transmits information regarding the old public key and the new public key of the second node to the first node 1 in response to the request from the old and new key information request unit 153 (steps S4 and S6; old and new key information transmission step). Specifically, the old and new key information transmission unit 251 of the second node 2A transmits information regarding the old public key and the new public key of the second node 2A to the first node 1 (step S4), and the old and new key information transmission unit 251 of the second node 2B transmits information regarding the old public key and the new public key of the second node 2B to the first node 1 (step S6).

Each time a request from the old and new key information request unit 153 is received, the old and new key information transmission unit 251 of each second node 2 may create a pair of an old public key and a new public key, and transmit information regarding the created old public key and new public key to the first node 1. Alternatively, many pairs of an old public key and a new public key may be prepared beforehand for a key change assistance service in the second key information K2 stored in the storage unit 24 of the second node 2; and when a request is received from the old and new key information request unit 153, the old and new key information transmission unit 251 may select one pair from the prepared pairs of an old public key and a new public key, and transmit information regarding the selected pair to the first node 1.

In this embodiment, it is assumed that the old public key transmitted (obtained) from the second node 2A is PKo[A], and that the new public key transmitted (obtained) from the second node 2A is PKo[A]. It is also assumed that the old public key transmitted (obtained) from the second node 2B is PKo[B], and that the new public key transmitted (obtained) from the second node 2B is PKo[B].

Subsequently, the draft contract preparation unit 154 of the first node 1 prepares a draft transaction contract (transaction) in which the old public key of the first node 1 and the old public keys obtained from the second nodes 2A and 2B are described as transmission sources, and the new public key of the first node 1 and the new public keys obtained from the second nodes 2A and 2B are described as the transmission destinations (steps S7, S8, and S9; draft contract preparation step).

Specifically, in step S7, the draft contract preparation unit 154 accesses the blockchain 3 and refers to the balances of the old public keys PKo[A] and PKo[B] obtained from the second nodes 2A and 2B. Thereby, the balance information can be confirmed in step S8. In this embodiment, it is assumed that the balances of the old public keys PKo[A] and PKo[B] are both 1.0 BTC. The form of communication between the first node 1 and the blockchain 3 may be non-encrypted communication, non-anonymous encrypted communication, or broadcasting.

Figure 5:
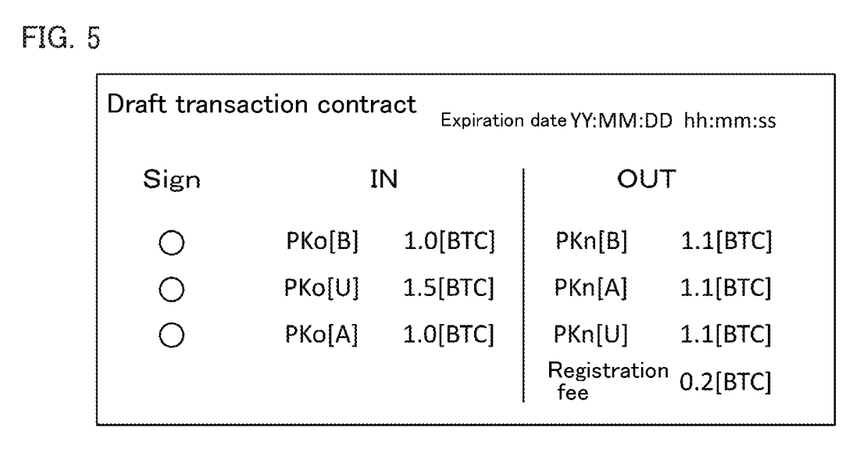
FIG. 5 is a specific example of a draft transaction contract.

Subsequently, in step S9, the draft contract preparation unit 154 prepares a draft transaction contract based on the three old public keys, i.e., the old public key of the first node 1 and the old public keys obtained from the second nodes 2A and 2B, the three new public keys, i.e., the new public key of the first node 1 and the new public keys obtained from the second nodes 2A and 2B, and the balance of each old public key. FIG. 5 shows a specific example of the draft transaction contract.

In the draft transaction contract, areas indicating signatures (Sign), transmission sources (IN), and transmission destinations (OUT) are provided in this order from the left. At the upper right of the draft transaction contract, there is an area indicating the expiration date. In the transmission source area, the three old public keys and the corresponding currency amounts (balances) are described. In the transmission destination area, the three new public keys and the corresponding currency amounts (remittance amounts) are described.

In this embodiment, it is assumed that in both the second nodes 2A and 2B, the key change assistance service fee is set to 0.1 BTC. Further, it is assumed that the fee for registration in the blockchain 3 (Fee) is 0.2 BTC. Thus, the currency amounts of the new public keys PKn[A] and PKn[B] of the second nodes 2A and 2B are both 1.1 BTC. The fee for registration in the blockchain 3 is usually borne by the user of the first node 1, who requests key exchange. The currency amount of the new public key PKn[U] of the first node 1 is thus 1.5−0.1×2−0.2=1.1 BTC.

Consider the case where there is regularity in the order relationship between the old public key group as the transmission sources and the new public key group as the transmission destinations described in the transaction contract. For example, in the case where there is regularity such that the order of the new public keys as the transmission destinations corresponds to that of the old public keys, if the old public keys are described as the transmission sources in the order of PKo[U], PKo[A], and PKo[B], the new public keys as the transmission destinations are described in the order of PKn[U], PKn[A], and PKn[B]. In this case, there is a risk that the regularity may be leaked to a third party; and the correspondence between the old and new public keys may thus also be leaked to the third party from the contents of the transaction contract.

In contrast, in this embodiment, since the draft contract preparation unit 154 randomly determines the order of the new public keys as the transmission destinations, the correspondence between the order of the old public keys as the transmission sources and the order of the new public keys as the transmission destinations is made random.

The old public keys and the new public keys are actually composed of irregular character strings. When the draft transaction contract shown in FIG. 5 is registered in the blockchain 3 as a transaction contract, anyone can confirm the transaction contract; however, third parties other than the user of the first node 1 cannot identify the correspondence between the old public keys PKo[U], PKo[A], and PKo[B] and the new public keys PKn[U], PKn[A], and PKn[B]. The user of the second node 2A can identify their old public key PKo[A] and new public key PKn[A]; however, the user cannot identify the correspondence between the other old public keys PKo[U] and PKo[B], and new public keys PKn[U] and PKn[B]. Similarly, the user of the second node 2B can identify their old public key PKo[B] and new public key PKn[B]; however, the user cannot identify the correspondence between the other old public keys PKo[U] and PKo[A], and new public keys PKn[U] and PKn[A]. That is, even the users of the second nodes 2A and 2B, which provide a key change assistance service, cannot identify the old public key PKo[U] and new public key PKn[U] of the first node 1 based on the draft transaction contract. Therefore, unlike the conventional technique, a problem such that masternodes that perform a key change assistance service know the correspondence between the old public key and the new public key of a key exchange requester does not arise, thus enabling public key changes with higher anonymity.

However, registering a draft transaction contract in the blockchain 3 requires an electronic signature by all nodes involved in the transaction. Thus, in the first node 1, the signature request unit 155 requests each of the selected second nodes 2A and 2B to sign in a place corresponding to the old public key of each second node of the draft transaction contract (steps S10 and S14; signature request step), and the first signature execution unit 156 executes a signature in a place corresponding to the first node 1 of the draft transaction contract (step S13; first signature execution step).

Specifically, the first node 1 randomly determines the signature order in the signature area of the draft transaction contract. In this embodiment, it is assumed that it is determined that the second node 2A, the first node 1, and the second node 2B sign in this order.

Figure 6A:
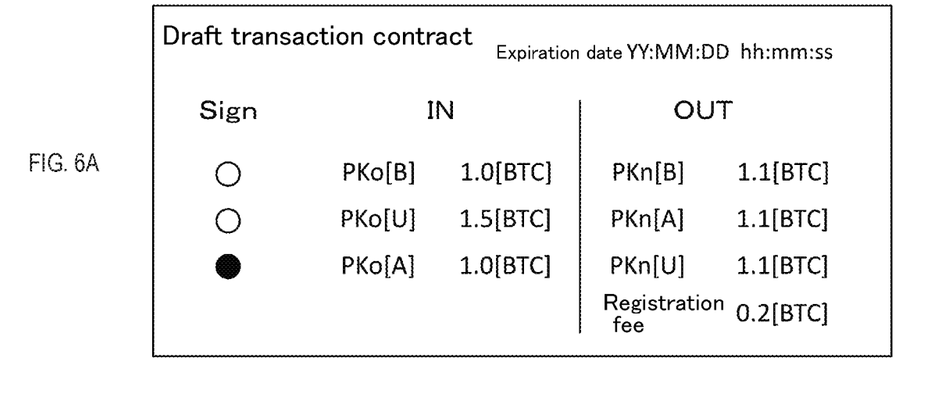

First, in step S10, the signature request unit 155 transmits the draft transaction contract to the second node 2A, and requests the second node 2A to sign in a place corresponding to the old public key of the second node 2A of the draft transaction contract. In response to the request from the signature request unit 155, the second signature execution unit 252 of the second node 2A confirms whether the correspondence between the transmission source and the transmission destination of the second node 2A in the draft transaction contract is valid, and executes a signature in a place corresponding to the old public key of the second node 2A of the draft transaction contract when the correspondence is valid (step S11; second signature execution step). In this embodiment, the minimum fee for the key change assistance service of the second node 2A is 0.1 BTC. Thus, when the amount obtained by subtracting the currency amount (balance) corresponding to the old public key PKo[A] described as the transmission source from the currency amount (remittance amount) corresponding to the new public key PKn[A] described as the transmission destination in the draft transaction contract is 0.1 BTC or more, the second signature execution unit 252 determines that the correspondence between the transmission source and the transmission destination of the second node 2A is valid, and signs in a signature area corresponding to the old public key PKo[A], as shown in FIG. 6(a).

Thereafter, the draft contract return unit 253 of the second node 2A returns the draft transaction contract signed by the second signature execution unit 252 to the first node 1 (step S12; draft contract return step).

Figure 6B:
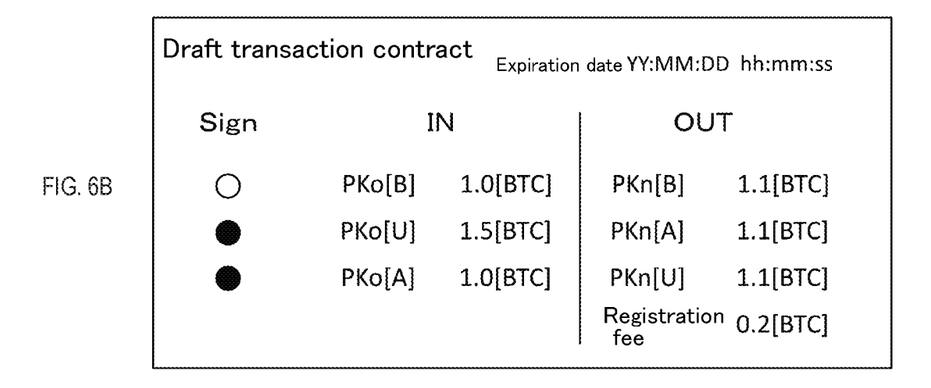

Subsequently, the first signature execution unit 156 of the first node 1 executes a signature in a place corresponding to the old public key of the first node 1 of the returned draft transaction contract (step S13). Thereby, the signature is signed in a signature area corresponding to the old public key PKo[U] in the draft transaction contract, as shown in FIG. 6(b).

Figure 6C:
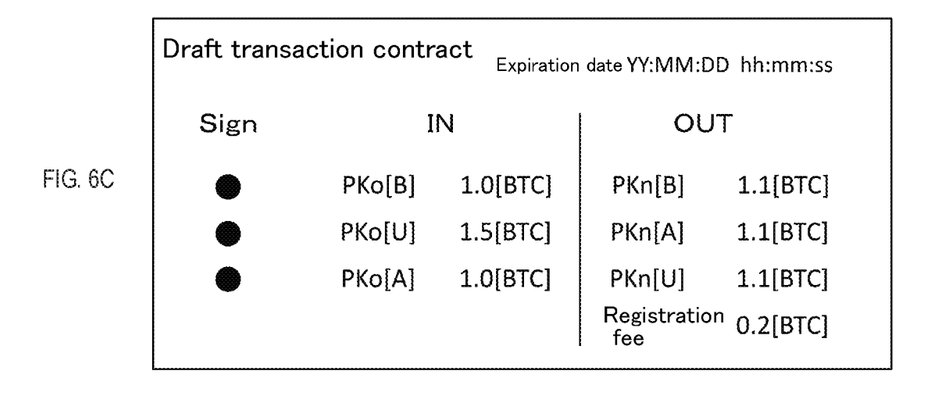

Subsequently, the signature request unit 155 of the first node 1 transmits the draft transaction contract to the second node 2B, and requests the second node 2B to sign in a place corresponding to the old public key of the second node 2B of the draft transaction contract (step S14). In response to the request from the signature request unit 155, the second signature execution unit 252 of the second node 2B confirms whether the correspondence between the transmission source and the transmission destination of the second node 2B in the draft transaction contract is valid, and executes a signature in a place corresponding to the old public key of the second node 2B of the draft transaction contract when the correspondence is valid (step S15; second signature execution step). In this embodiment, the minimum fee for the key change assistance service of the second node 2B is 0.1 BTC as in the second node 2A. Thus, when the amount obtained by subtracting the currency amount (balance) corresponding to the old public key PKo[B] described as the transmission source from the currency amount (remittance amount) corresponding to the new public key PKn[B] described as the transmission destination in the draft transaction contract is 0.1 BTC or more, the second signature execution unit 252 determines that the correspondence between the transmission source and the transmission destination of the second node 2B is valid and signs in a signature area corresponding to the old public key PKo[B], as shown in FIG. 6(c). Accordingly, all signatures in the draft transaction contract are completed.

Thereafter, the draft contract return unit 253 of the second node 2B returns the draft transaction contract signed by the second signature execution unit 252 to the first node 1 (step S16; draft contract return step).

Subsequently, the registration unit 157 of the first node 1 registers in the blockchain 3 the draft transaction contract in which all signatures are completed as a transaction contract (step S17; registration step). More specifically, when the transaction contract is approved by miners and added to the blockchain 3 by the expiration date described in the transaction contract, registration of the transaction contract is completed (step S18). All of the nodes including the first node 1 can make inquiries to the blockchain 3 (step S19) to confirm the registered transaction contract (Step S20).

As described above, when the transaction contract is registered in the blockchain 3, the public key change (from PKo[U] to PKn[U]) of the first node 1 (as well as those of the second nodes 2A and 2B) is completed. As mentioned above, even if a third party other than the user of the first node 1 refers to the transaction contract (=draft transaction contract) registered in the blockchain 3, the third party cannot identify the new public key PKn[U] corresponding to the old public key PKo[U] of the first node 1.

The correspondence between the old public key and the new public key of each of the second nodes 2A and 2B is known to the first node 1. Because the second nodes 2A and 2B are usually vendors that provide a key change assistance service, it is not problematic even if the public keys provided for the service are associated with the node information.

In this embodiment, the following processing is performed in order to further enhance the anonymity in key exchange.

As described above, in this embodiment, the draft transaction contract is signed in the order of the second node 2A, the first node 1, and the second node 2B. However, in the case where the first node 1 exchanges its public key multiple times, if there is regularity in the order of the nodes that sign a draft transaction contract, there is a risk that the regularity may be leaked to a third party; and the correspondence between the old and new public keys may be guessed by the third party who knows the regularity based on the contents of the transaction contract.

The signature request unit 155 and the first signature execution unit 156 are thus set to perform signature request and execution, respectively, so that the order of nodes that sign a draft transaction contract is random. For example, if the nodes that sign a draft transaction contract are the first node 1, the second node 2A, and the second node 2B, i.e., three nodes, the signature order has six patterns. The signature request unit 155 and the first signature execution unit 156 randomly select the order from among the six patterns every time the public key is exchanged. This makes it difficult for third parties other than the user of the first node 1 to guess the correspondence between the old public key and the new public key of the first node 1.

Moreover, in this embodiment, unlike Monero, since the remittance amount is not encrypted in a transaction contract, a third party can know the balance of an account owned by another person in real time. The system according to this embodiment thus enables a public key change with higher anonymity, while having a function by which a third party can make balance inquiries in real time.

Additionally, a large variation in the balances among the old public keys or the new public keys described in a draft transaction contract makes it easier to guess the correspondence between the old and new public keys based on the balance tendency. It is thus preferable to reduce the variation in the balances among the old public keys and among the new public keys described in a draft transaction contract. That is, the old and new key information request unit 153 of the first node 1 preferably specifies the balance range so that the ratio of the minimum value to the maximum value among the balances corresponding to the public keys is close to 1 in the transmission sources and in the transmission destinations of a draft transaction contract, and requests old and new key information from each second node 2. For example, the old and new key information request unit 153 requests, from each second node 2, old and new key information regarding an old public key whose balance is ½ to twice the balance of the old public key of the first node 1.

In the draft transaction contract shown in FIG. 5, the ratio of the minimum value to the maximum value among the balances of the old public keys described as the transmission sources is ⅔, which is relatively close to 1 (small variation). Therefore, the ratio of the minimum value to the maximum value among the balances of the new public keys described as the transmission destinations can be also made equal to 1, and it cannot be identified which new public key is the new public key of the first node 1.

As described above, the anonymity in key exchange can be further enhanced by reducing the variation in the balances among the old public keys and among the new public keys described in a draft transaction contract.

Additional Notes

Although an embodiment of the present invention is described above, the invention is not limited to this embodiment, and various modifications may be made without departing from the spirit and principal concept of the invention.

In the above embodiment, an example in which one old public key is changed to one new public key is described. However, the number of old public keys that are changed at one time is not particularly limited. The greater the number of old public keys that are changed at one time, the more complicated the correspondence between the old and new public keys in a draft transaction contract; and thus the higher the anonymity in key exchange.

Similarly, in the above embodiment, the number of pairs of an old public key and a new public key that each second node 2 transmits to the first node 1 is one. However, the number of pairs is not particularly limited. The greater the number of pairs, the more complicated the correspondence between the old and new public keys in a draft transaction contract; and thus the higher the anonymity in key exchange.

Although the second node group selection unit 152 selects two second nodes 2 in the above embodiment, the second node group selection unit 152 may select three or more second nodes 2. The greater the number of second nodes 2 selected by the second node group selection unit 152, the more complicated the correspondence between the old and new public keys described in a draft transaction contract; and thus the higher the anonymity in key exchange. However, as the number of second nodes 2 selected by the second node group selection unit 152 increases, the key change assistance service fee borne by the first node 1 increases. Thus, the number of second nodes 2 selected for one public key exchange is preferably determined in consideration of cost-effectiveness.

The fee for the key change service of each second node 2 is not particularly limited, and an embodiment in which the second node 2 provides a key change service for free is also included in the present invention.

In the above embodiment, although the information processing system is a platform using the blockchain technique, the present invention is not limited thereto. The information processing system may be a typical client/server system. In this case, a transaction contract is registered in a database provided in a server etc., instead of the blockchain.

DESCRIPTION OF REFERENCE NUMERALS

1 First node
2 Second node
2A Second node
2B Second node
3 Blockchain
11 Input unit
12 Display unit
13 Communication unit
14 Storage unit
15 Control unit
151 New public key creation unit
152 Second node group selection unit
153 Old and new key information request unit
154 Draft contract preparation unit
155 Signature request unit
156 First signature execution unit
157 Registration unit
21 Input unit
22 Display unit
23 Communication unit
24 Storage unit
25 Control unit
251 Old and new key information transmission unit
252 Second signature execution unit
253 Draft contract return unit
100 Information processing system
K1 First key information
K2 Second key information
N Communication network
P1 First program
P2 Second program
PKn New public key
Pko Old public key

The invention claimed is:
1. An information processing system comprising at least one first node, second nodes for providing a public key change assistance service, and a database, wherein
the first node comprises a first processor and a first non-transitory computer readable medium storing instructions that when executed by the first processor cause the first processor to perform operations comprising:
creating a new public key of the first node, selecting at least two different second nodes from among the second nodes,
requesting, from each selected second node, information regarding an old public key of each selected second node and a new public key of each selected second node,
preparing a draft transaction contract in which an old public key of the first node and each old public key obtained from each selected second node are described as transmission sources, and the new public key of the first node and each new public key obtained from each selected second node are described as transmission destinations,
requesting each selected second node to sign in a place corresponding to each selected second node of the draft transaction contract,
executing a signature in a place corresponding to the first node of the draft transaction contract, and
registering the draft transaction contract in which all signatures are completed as a transaction contract in the database;
each selected second node comprises a second node processor and a second node non-transitory computer readable medium storing instructions that when executed by the second node processor cause the second node processor to perform operations comprising:
transmitting information regarding each old public key of each selected second node and each new public key of each selected second node to the first node in response to the request for information regarding each old public key of each selected second node and each new public key of each selected second node,
confirming whether a correspondence between the transmission source and the transmission destination of each selected second node in the draft transaction contract is valid in response to the request for each selected second node to sign in the place corresponding to each selected second node of the draft transaction contract, and executing a signature in each place corresponding to each selected second node of the draft transaction contract when the correspondence is valid, and
returning the signed draft transaction contract to the first node;
wherein an order of the new public keys as the transmission destinations is randomly determined; and
wherein operations by the first processor requesting each selected second node to sign and the operation by the first processor executing a signature are ordered randomly so that an order of the nodes that sign the draft transaction contract is random.
2. The information processing system according to claim 1, wherein the database is a blockchain.

3. A method for changing a public key in an information processing system comprising at least one first node, second nodes for providing a public key change assistance service, and a database, the method comprising in the first node:
creating a new public key of the first node;
selecting at least two different second nodes from among the second nodes;
requesting, from each selected second node, information regarding an old public key of each selected second node and a new public key of each selected second node;
the method further comprising, in each selected second node:
transmitting information regarding each old public key of each selected second node and each new public key of each selected second node to the first node in response to the request for information regarding each old public key of each selected second node and each new public key of each selected second node;
the method further comprising, in the first node:
preparing a draft transaction contract in which an old public key of the first node and each old public key obtained from each selected second node are described as transmission sources, and the new public key of the first node and each new public key obtained from each selected second node are described as transmission destinations;
requesting each selected second node to sign in a place corresponding to each selected second node of the draft transaction contract;
the method further comprising, in each selected second node:
confirming whether a correspondence between the transmission source and the transmission destination of each selected second node in the draft transaction contract is valid in response to the request for each selected second node to sign in the place corresponding to each selected second node of the draft transaction contract, and executing a signature in each place corresponding to each selected second node of the draft transaction contract when the correspondence is valid;
returning the signed draft transaction contract to the first node;
the method further comprising, in the first node:
executing a signature in a place corresponding to the first node of the draft transaction contract; and
registering the draft transaction contract in which all signatures are completed as a transaction contract in the database;
wherein an order of the new public keys as the transmission destinations is randomly determined; and
wherein the steps, in the first node, requesting each selected second node to sign and the steps, in the first node, executing a signature are ordered randomly so that the order of the nodes that sign the draft transaction contract is random.

4. The method for changing a public key according to claim 3, wherein the database is a blockchain.

5. A non-transitory computer readable medium storing instructions that when executed by a processor cause the processor to perform operations for assisting in changing a public key of a first node communicatively connected to second nodes for providing a public key change assistance service and a database, the operations comprising
creating a new public key of the first node,
selecting at least two different second nodes from among the second nodes,
requesting, from each selected second node, information regarding an old public key of each selected second node and a new public key of each selected second node,
preparing a draft transaction contract in which an old public key of the first node and each old public key obtained from each selected second node are described as transmission sources, and the new public key of the first node and each new public key obtained from each selected second node are described as transmission destinations,
requesting each selected second node to sign in a place corresponding to each selected second node of the draft transaction contract,
executing, a signature in a place corresponding to the first node of the draft transaction contract, and
registering the draft transaction contract in which all signatures are completed as a transaction contract in the database;
wherein an order of the new public keys as the transmission destinations is randomly determined; and
wherein operations by the processor requesting each selected second node to sign and the operation by the processor executing a signature are ordered randomly so that an order of the nodes that sign the draft transaction contract is random.

6. The non-transitory computer readable medium storing instructions according to claim 5, wherein the database is a blockchain.

7. A method for building an information processing system that comprises at least one first node, second nodes for providing a public key change assistance service, and a database, the first node including a first processor and a first non-transitory computer readable medium for storing instructions, each second node including a second node processor and a second node non-transitory computer readable medium for storing instructions, the method comprising:
delivering to the first node first instructions for storing on the first non-transitory computer readable medium, the first instructions, when executed by the first processor, causing the first processor to perform operations comprising:
creating a new public key of the first node,
selecting at least two different second nodes from among the second nodes,
requesting, from each selected second node, information regarding an old public key of each selected second node and a new public key of each selected second node,
preparing a draft transaction contract in which an old public key of the first node and each old public key obtained from each selected second node are described as transmission sources, and the new public key of the first node and each new public key obtained from each selected second node are described as transmission destinations,
requesting each selected second node to sign in a place corresponding to each selected second node of the draft transaction contract,
executing a signature in a place corresponding to the first node of the draft transaction contract, and
registering the draft transaction contract in which all signatures are completed as a transaction contract in the database; and
delivering to each second node second instructions for storing on each second node non-transitory computer readable medium, the second instructions, when executed by each second node processor, causing each second node processor to perform operations comprising: transmitting information regarding each old public key of each selected second node and each new public key of each selected second node to the first node in response to the request for information regarding each old public key of each selected second node and each new public key of each selected second node, confirming whether a correspondence between the transmission source and the transmission destination of each selected second node in the draft transaction contract is valid in response to the request for each selected second node to sign in the place corresponding to each selected second node of the draft transaction contract, and executing a signature in each place corresponding to each selected second node of the draft transaction contract when the correspondence is valid, and returning the signed draft transaction contract to the first node;

wherein an order of the new public keys as the transmission destinations is randomly determined; and wherein operations by the first processor requesting each selected second node to sign and the operation by the first processor executing a signature, are ordered randomly so that an order of the nodes that sign the draft transaction contract is random.

8. The method for building an information processing system according to claim 7, wherein the database is a blockchain.

* * * * *